(12) United States Patent
Zhou

(10) Patent No.: US 8,272,135 B2
(45) Date of Patent: Sep. 25, 2012

(54) SAW BLADE CLAMPING MECHANISM FOR A POWER TOOL

(75) Inventor: Hongtao Zhou, Nanjing (CN)

(73) Assignee: Chervon Limited, Hong Kong (HK)

( * ) Notice: Subject to any disclaimer, the term of this patent is extended or adjusted under 35 U.S.C. 154(b) by 456 days.

(21) Appl. No.: 11/969,095

(22) Filed: Jan. 3, 2008

(65) Prior Publication Data

US 2008/0168666 A1    Jul. 17, 2008

(30) Foreign Application Priority Data

Jan. 16, 2007   (CN) ..................... 2007 2 0033319 U

(51) Int. Cl.
*B23D 51/10*   (2006.01)
(52) U.S. Cl. ................. 30/392; 30/337; 279/75
(58) Field of Classification Search .......... 30/335, 30/392, 393, 339, 337; 83/699.21; 279/71, 279/75, 81, 902, 905
See application file for complete search history.

(56) References Cited

U.S. PATENT DOCUMENTS

| 3,750,283 | A | * | 8/1973 | Hoffman | 30/338 |
| 4,204,692 | A | * | 5/1980 | Hoffman | 279/81 |
| 4,299,402 | A | * | 11/1981 | Hoffman | 279/75 |
| 4,441,255 | A | * | 4/1984 | Hoffman | 30/392 |
| 5,306,025 | A | * | 4/1994 | Langhoff | 279/90 |
| 5,575,071 | A | * | 11/1996 | Phillips et al. | 30/392 |
| 6,209,208 | B1 | | 4/2001 | Marinkovich et al. | |
| 6,276,065 | B1 | * | 8/2001 | Osada et al. | 30/392 |
| 6,612,039 | B2 | * | 9/2003 | Kakiuchi et al. | 30/392 |
| 6,725,548 | B1 | | 4/2004 | Kramer et al. | |
| 7,040,023 | B2 | * | 5/2006 | Nemazi et al. | 30/392 |
| 7,251,897 | B2 | * | 8/2007 | Shuhua | 30/392 |

* cited by examiner

*Primary Examiner* — Boyer D. Ashley
*Assistant Examiner* — Omar Flores Sanchez
(74) *Attorney, Agent, or Firm* — Greenberg Traurig, LLP

(57) ABSTRACT

A saw blade clamping mechanism includes a saw blade spindle, a support sleeve, a clamping pin, and a rotating sleeve. The spindle has a longitudinal receiving slot and an axial elongate slot. The rotating sleeve has a retaining slot. A movable pin is secured on the rotating sleeve and extends through the elongate slot. A latch pin is fixed on the support sleeve and is held within the retaining slot. The rotating sleeve is movable from a first position to a second position. When the rotating sleeve is in the first position, the latch pin is positioned at an outer end of the circumferential section of the retaining slot and the clamping pin inserts into the longitudinal receiving slot of the spindle to fix a saw blade. When the rotating sleeve is in the second position, the latch pin is positioned at an upper end of the axial section of the retaining slot and the clamping pin retracts from the receiving slot of the spindle to release the saw blade.

10 Claims, 3 Drawing Sheets

SAW BLADE CLAMPING MECHANISM FOR A POWER TOOL

BACKGROUND

The present invention relates to a saw blade clamping mechanism for a power tool, and especially relates to an improved blade clamping mechanism for a cutting tool.

A cutting tool, such as a reciprocating saw for example, typically comprises an elongate blade mounted on a top end of a driving pole for performing cutting. Therefore, it is important to design a saw blade clamping mechanism which allows quick replacement of the saw blade.

U.S. Pat. Nos. 6,209,208 and 6,725,548 disclose a saw blade clamping mechanism which mainly comprises a driving spindle on which a longitudinal slot and a radial spindle orifice are formed, a sleeve which is immovable relative to the spindle, a pin held in a receiving orifice of the sleeve, and a cam member surrounding the sleeve. The cam member could be positioned between a first circumferential position and a second circumferential position and has an inner curved surface having varying radiuses. When the cam member is positioned at the first position, the curved surface resists the outside end of the pin and the inside end thereof gets through the radial spindle orifice, then inserts into the longitudinal slot; when the cam member is positioned at the second position, the curved surface disengages from the outside end of the pin and the inside end retracts back from the longitudinal slot of the spindle. Therefore, to mount a saw blade to the power tool, the operator should insert the blade into the longitudinal slot of the spindle and turn the cam member to the first position. Under constraining of the cured surface, the pin will be pushed to the spindle along the sleeve orifice and gets through the spindle orifice and finally inserts a hole of the blade, thus the blade is clamped tightly on the spindle. To dismount the blade, the operator should turn the cam member to the second position to make the cam member disengage from the pin, then the inside end of the pin will retract from the hole of the blade and the blade could be taken away.

Mounting or dismounting of the blade through the saw blade clamping mechanism described hereinabove is not too complex, just by operation of the cam member, but the operator must keep the cam member at the second position before inserting the blade and make sure the cam member is at the first position after the blade is mounted, such that normally the operator should hold the blade with one hand and at the same time grasp the cam member by the other hand, which makes the operator feel uncomfortable.

SUMMARY

The following describes a saw blade clamping mechanism for a power tool, which can move to and stay on desired positions automatically such as to allow quick mounting or dismounting of the saw blade. More particularly, the saw blade clamping mechanism of the present invention comprises a spindle on which a longitudinal receiving slot and a radial spindle orifice are formed, a clamping pin disposed in the spindle orifice, a rotating sleeve which has an inner surface that abuts an outer end of the clamping pin, wherein the inner surface is a cam surface with varying radiuses, an axially extended elongate slot formed on the spindle, a retaining slot which has a circumferential section and an axial section is formed on an outer circumference of the rotating sleeve, a guide pin fixed on the rotating sleeve that extends through the axial elongated slot of the spindle, a latch pin secured on the spindle and constrained by the retaining slot, a torsion spring and a pressing spring connected between the spindle and the rotating sleeve to bias the rotating sleeve to a first position or to a second position. When the rotating sleeve is in the first position, the latch pin is positioned at an outer end of the circumferential section of the retaining slot, the cam surface resists on the outer end of the press pin to urge an inner end thereof to insert into the longitudinal receiving slot of the spindle. When the rotating sleeve is in the second position, the latch pin is positioned at an upper end of the axial section of the retaining slot, the cam surface releases the clamping pin and the inner end thereof retracts from the receiving slot of the spindle.

The blade clamping mechanism also facilitates exchanging of blades. To dismount the blade, the rotating sleeve is rotated such as to move the latch pin to a lower end of the axial section of the retaining slot, the rotating sleeve is then axially biased to the second position whereat the blade is free to be taken away. Since the latch pin is circumferentially restricted by the axial section of the retaining slot, the rotating sleeve is kept in the second position until a new blade is inserted into the longitudinal receiving slot of the spindle. An insert force which is exerted on the new blade moves the guide pin and consequently the rotating sleeve upwardly. Thereby the latch pin moves along the axial section of the retaining slot to the circumferential section of the retaining slot, and then the rotating sleeve is free to rotate to the first position. As a result, the cam surface of the rotating sleeve resists the outer end of the clamping pin such that the inner end of the clamping pin is pushed to insert into the position hole of the blade, and the blade is thus secured on the spindle.

Accordingly, the blade clamping mechanism will stay open after the blade is removed, and is ready for receiving a new blade. To mount a blade, it is merely needed to insert the blade into the receiving slot of the spindle; the rotating sleeve will rotate automatically to fix the blade in position when the blade reaches an exact position. Therefore, mounting or dismounting of the saw blade does not need any other assistant operation, and such that it is much more convenient relative to the prior art.

DETAILED DESCRIPTION

Figure 1:
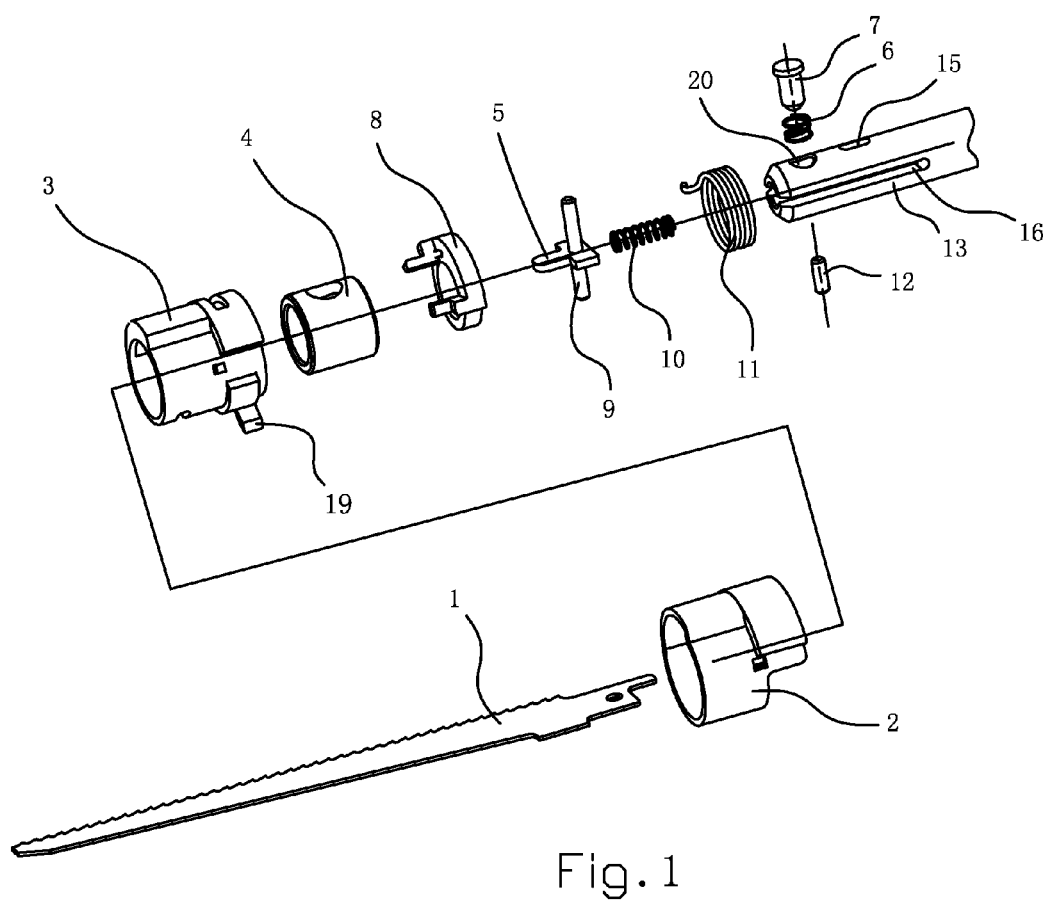
FIG. 1 is an exploded view of an exemplary saw blade clamping mechanism according to the preferred embodiment of the present invention.

Referring to FIG. 1, a saw blade clamping mechanism in accordance with a preferred embodiment of the present invention comprises a spindle 13 on a top end of which a longitudinal receiving slot 16 is formed, a spindle orifice 20 radially extends through the receiving slot 16, a clamping pin 7 is slidably positioned with the spindle orifice 20, a latch pin 12 is fixed on the spindle 13, a first pressing spring 6 is disposed between the clamping pin 7 and the spindle 13 to bias the clamping pin 7 outward from the receiving slot 16.

A support sleeve 4 surrounds the spindle 13 and is fixedly connected thereto by the latch pin 12. A rotating sleeve 3 has a first end that embraces the support sleeve 4 and a second end that embraces a retainer sleeve 8 which is connected between the spindle 13 and the rotating sleeve 3. The rotating sleeve 3 comprises a knob 19, an inner surface which abuts against an outside end of the press pin 7 formed as a cam surface 18 with varying radiuses (referring to FIG. 2C and FIG. 3C), and an "L" shaped retaining slot 14 which has a circumferential section and an axial section (referring FIG. 2A and FIG. 3A). The outside end of the latch pin 12 is held in the "L" shaped retaining slot 14. A torsion spring 11 is positioned with two ends secured to the retainer sleeve 8 and the spindle 13, respectively. The retainer sleeve 8 is restrained by the support sleeve 4 and the torsion spring 11 and thus is axially immovable, while in the circumferential direction is rotatable with the rotating sleeve 3 relative to the spindle 13.

A "T" shaped sliding unit 5 is received in the longitudinal receiving slot 16 of the spindle 13. A second pressing spring 10 is biased between a top interior end of the longitudinal slot 16 and the "T" shaped sliding unit 5. A guide pin 9 is fixed on the "T" shaped sliding unit 5 and is movably guided within an axial elongate slot 15 which is formed on the spindle 13. Two ends of the movable pin 9 are fixed on the rotating sleeve 3. To avoid being defiled and to secure smoothness of the relative movement between each movable part, a dust cover 2 is provided to surround the rotating sleeve 3.

The rotating sleeve 3 is movable between a first position and a second position relative to the spindle 13. Under biasing force of the torsion spring 11, the rotating sleeve 3 tends to the first position. Under biasing force of the second pressing spring 10, the rotating sleeve 3 tends to the second position.

Figure 2A:
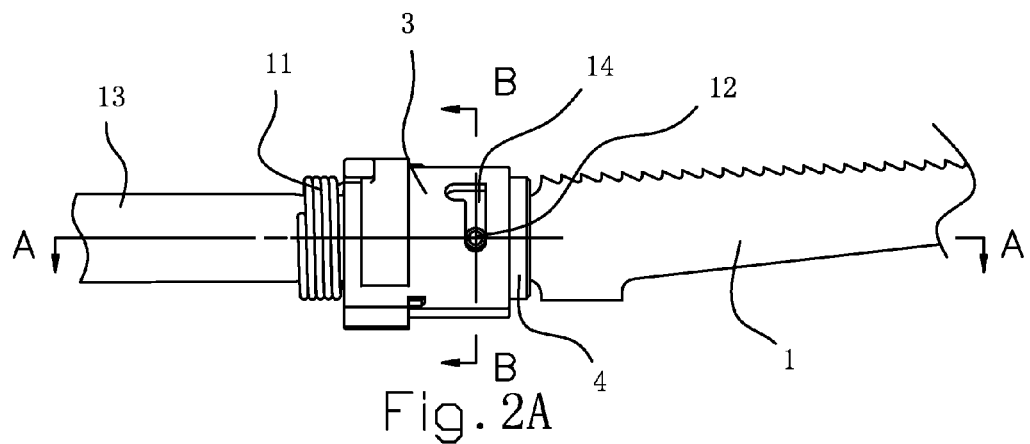
FIG. 2A is a plan view of the blade clamping mechanism of FIG. 1 wherein a saw blade is mounted.
Figure 2B:
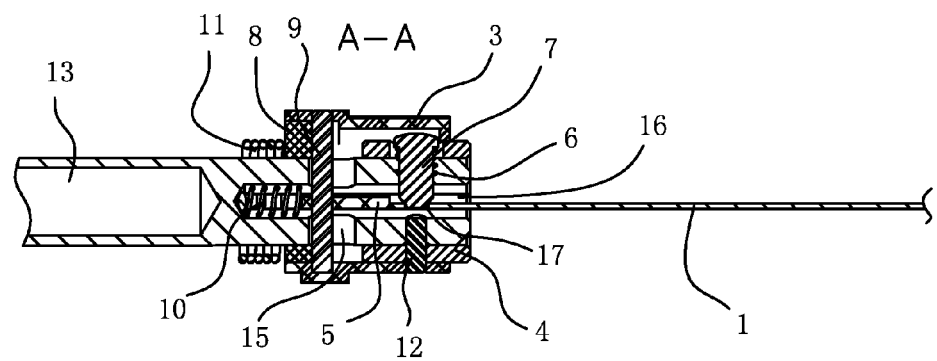
FIG. 2B is a sectional view taken along line A-A of FIG. 2A.
Figure 2C:
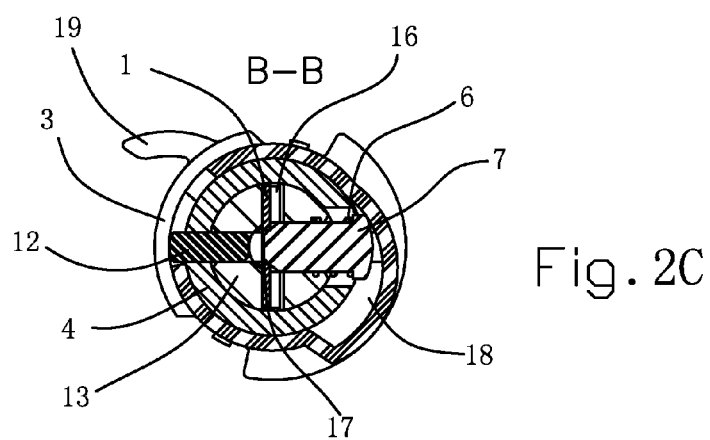
FIG. 2C is a sectional view taken along line B-B of FIG. 2A.

Referring to FIGS. 2A, 2B and 2C, when a blade 1 is inserted into the receiving slot 16 of the spindle 13 and overcomes the biasing force of the second pressing spring 10 to push the sliding unit 5, the guide pin 9 will drive the rotating sleeve 3 to move axially relative to the spindle 13 and, as a result, the latch pin 12 moves from the top end of the axial section of the "L" shaped retaining slot 14 to the circumferential section. Then, under the biasing force of the torsion spring 11, the rotating sleeve 3 rotates to the first position automatically, whereat the latch pin 12 is positioned at the outer end of the circumferential section of the "L" shaped retaining slot 14, and the cam surface 18 of the rotating sleeve 3 resists against the outer end of the clamping pin 7 such that the inner end of the clamping pin 7 inserts into a position hole 17 of the blade 1 which is received in the receiving slot 16. Thus the blade 1 is fixed to the spindle 13 tightly.

Figure 3A:
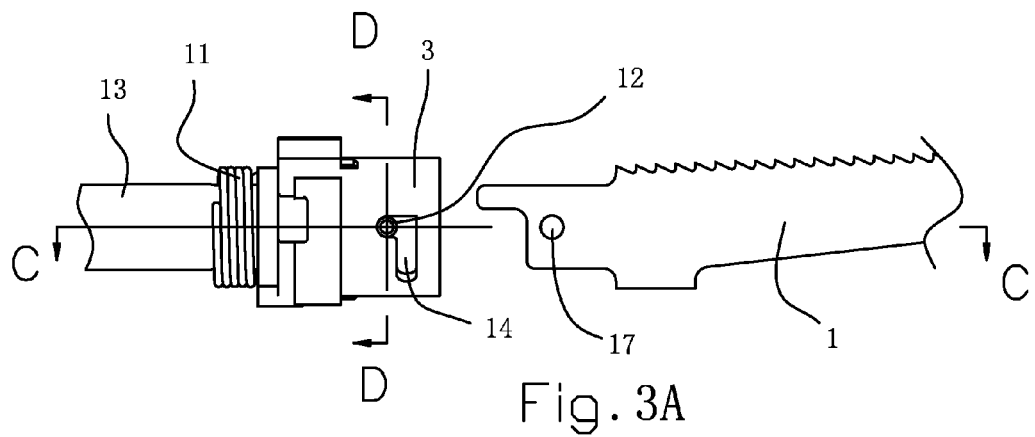
FIG. 3A is a plan view of the blade clamping mechanism of FIG. 1 wherein the blade is dismounted.
Figure 3B:
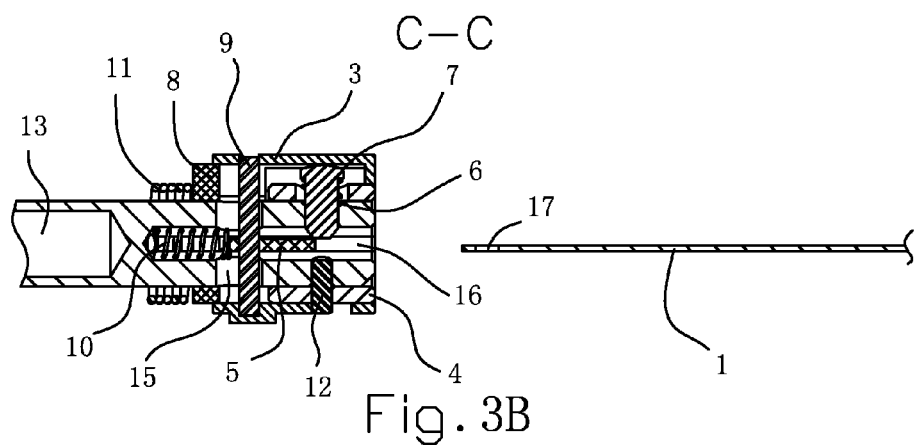
FIG. 3B is a sectional view taken along C-C of FIG. 3A.
Figure 3C:
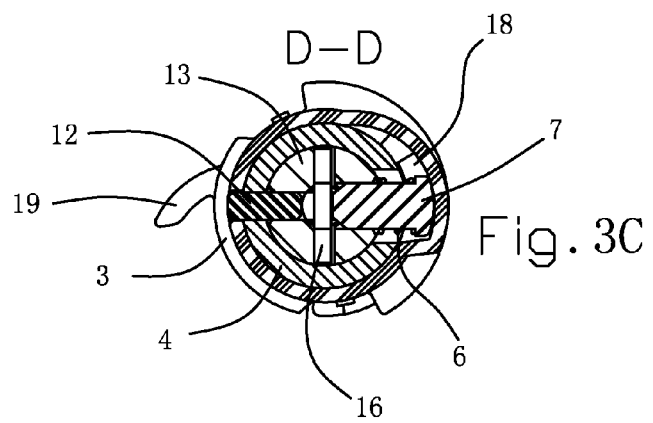
FIG. 3C is a sectional view taken along D-D of FIG. 3A.

Referring FIGS. 3A, 3B and 3C, when an operator rotates the knob 19 of the rotating sleeve 3 counter to the biasing force of the torsion spring 11, the latch pin 12 will move from the circumferential section of the "L" shaped retaining slot 14 to the axial section whereat the cam surface of the rotating sleeve 3 releases the outer end of the clamping pin 7 such that the inner end of the clamping pin retracts automatically from the position hole 17 of the blade 1 under the biasing force of the first pressing spring 6. Then, the rotating sleeve 3 moves downwardly under the biasing force of the second pressing spring 10 until the latch pin 12 reaches the top end of the axial section of the "L" shaped retaining slot 14 whereat the rotating sleeve 3 is at the second position and the blade 1 is pushed out of the receiving slot 16 by the "T" shaped sliding unit 5. As will therefore be appreciated, the saw blade clamping mechanism described hereinabove does not need any other assistant operation during mounting or dismounting of the blade and, as such, it is much more convenient for operating.

Besides the embodiment disclosed hereinabove, the present invention may have many other embodiments. Accordingly, substitutes and modifications according to the spirit of the present invention will be regarded as falling within the appended claims of the present invention.

What is claimed is:

1. A saw blade clamping mechanism, comprising:
   a spindle having a longitudinal receiving slot, a radial spindle orifice, and an axially extended elongated slot;
   a clamping pin disposed in the spindle orifice;
   a rotating sleeve having an inner surface abutting an outer end of the clamping pin, a retaining slot having a circumferential section, and an axial section formed on an outer circumference of the rotating sleeve, wherein the axial section includes an upper end that is distal to a saw blade when the saw blade is being inserted into or removed from the receiving slot and a lower end that is proximate to the saw blade when the saw blade is being inserted into or removed from the receiving slot, and wherein the inner surface is a cam surface with varying radiuses;
   a guide pin axially fixed on the rotating sleeve and extending through the axial elongated slot of the spindle;
   a latch pin secured on the spindle and constrained by the retaining slot; and
   a torsion spring and a pressing spring connected between the spindle and the rotating sleeve to bias the rotating sleeve to one of a first position and a second position;
   wherein when the rotating sleeve is in the first position, the latch pin is positioned at an outer end of the circumferential section of the retaining slot, the cam surface resists on the outer end of the clamping pin to urge an inner end thereof to insert into the longitudinal receiving slot of the spindle; and
   when the rotating sleeve is in the second position, the latch pin is positioned at an the upper end of the axial section of the retaining slot, the cam surface releases the clamping pin and the inner end thereof retracts from the receiving slot of the spindle.

2. The saw blade clamping mechanism according to claim 1, wherein the retaining slot is "L" shaped.

3. The saw blade clamping mechanism according to claim 1, wherein the guide pin is fixed on a sliding unit which is at least partly disposed in the longitudinal receiving slot and connected between the pressing spring and a blade.

4. The saw blade clamping mechanism according to claim 3, wherein, when the rotating sleeve is moved from the first position to the second position, the blade is pushed out of the receiving slot by the sliding unit.

5. The saw blade clamping mechanism according to claim 1, wherein a retainer sleeve is disposed between the rotating sleeve and the spindle and is axially immovable relative to the spindle while being rotatable with the rotating sleeve, and two ends of the torsion spring are fixed on the retainer sleeve and the spindle respectively.

6. The saw blade clamping mechanism according to claim 5, comprising a support sleeve secured on the spindle by the latch pin, the retainer sleeve being axially restrained by the support sleeve and the torsion spring.

7. The saw blade clamping mechanism according to claim 1, wherein the rotating sleeve at least partly embraces the support sleeve.

8. The saw blade clamping mechanism according to claim 1, comprising a dust cover surrounding the rotating sleeve.

9. The saw blade clamping mechanism according to claim 1, wherein the inner end of the clamping pin is conically shaped.

10. The saw blade clamping mechanism according to claim 1, wherein, when the rotating sleeve is in the first position, the guide pin is located at an upper end of the elongate slot and, when the rotating sleeve is in the second position; the guide pin is located at a lower end of the elongate slot.

* * * * *